US012416353B2

(12) United States Patent
Toyama

(10) Patent No.: US 12,416,353 B2
(45) Date of Patent: Sep. 16, 2025

(54) CASE

(71) Applicants: JATCO LTD, Fuij (JP); Nissan Motor Co., Ltd., Yokohama (JP)

(72) Inventor: Hisashi Toyama, Shizuoka (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/291,993

(22) PCT Filed: Jun. 22, 2022

(86) PCT No.: PCT/JP2022/024983
§ 371 (c)(1),
(2) Date: Jan. 25, 2024

(87) PCT Pub. No.: WO2023/037695
PCT Pub. Date: Mar. 16, 2023

(65) Prior Publication Data
US 2024/0369131 A1    Nov. 7, 2024

(30) Foreign Application Priority Data

Sep. 8, 2021 (JP) ................................. 2021-146523

(51) Int. Cl.
*F16H 57/02* (2012.01)
*F16H 57/03* (2012.01)

(52) U.S. Cl.
CPC ............. *F16H 57/02* (2013.01); *F16H 57/03* (2013.01); *F16H 2057/02017* (2013.01)

(58) Field of Classification Search
CPC ...................... F16H 57/02; F16H 57/03; F16H 2057/02017; F16H 2057/02021
See application file for complete search history.

(56) References Cited

U.S. PATENT DOCUMENTS

| 3,246,538 A * | 4/1966 | Easton ...................... F16H 1/20 |
| | | 74/606 R |
| 4,108,021 A * | 8/1978 | MacAfee ........... B60K 17/3467 |
| | | 74/606 R |
| 8,911,312 B2 * | 12/2014 | Itoo ..................... F16H 57/0489 |
| | | 474/93 |

FOREIGN PATENT DOCUMENTS

| JP | 2000-110922 A | 4/2000 |
| JP | 2005-172125 A | 6/2005 |
| JP | 2017-082958 A | 5/2017 |

* cited by examiner

*Primary Examiner* — Thomas C Diaz
(74) *Attorney, Agent, or Firm* — Global IP Counselors, LLP

(57) ABSTRACT

A case that houses a drive force transmission device includes a circular ring part, fastening boss parts, first ribs, a non-fastening boss part, and a second rib. The circular ring part defines an opening through which a shaft is configured to be inserted. The fastening boss parts are provided around the circular ring part. Fastening members are to be secured to the fastening boss parts. The first ribs are respectively formed between a portion of the fastening boss parts and the circular ring part when viewed from an axial direction of the shaft. The non-fastening boss part is provided between adjacent ones of the fastening boss parts to which the first ribs are not connected, when viewed from the axial direction. A fastening member is not configured to be secured to the non-fastening boss part. The second rib is formed between the non-fastening boss part and the circular ring part.

21 Claims, 12 Drawing Sheets

1
CASE

This is a U.S. national phase application of PCT/JP2022/024983, filed on Jun. 22, 2022, which claims priority to Japanese Patent Application No. 2021-146523, filed on Sep. 8, 2021. The entire disclosure of Japanese Patent Application No. 2021-146523 is hereby incorporated herein by reference.

TECHNICAL FIELD

The present invention relates to a case.

BACKGROUND ART

Japanese Laid-Open Patent Publication No. 2017-82958 discloses a transmission case having an opening through which a drive shaft is inserted. This transmission case has a rib that extends radially from a circular ring part that forms the opening, and connects to a bolt boss for fastening.

SUMMARY

This case has ribs provided between a circular ring part that forms an opening through which a shaft is inserted, and bolt bosses for fastening, increasing the strength. In this case, if holes for a component to pass through or thick parts for an oil passage to pass through are formed between the bolt boss and the circular ring part, locations may occur where ribs cannot be provided.

When manufacturing this kind of case by casting, molten metal inside a mold is supplied to each part via recesses corresponding to the ribs. Molten metal is not easily supplied to locations where there are no recesses corresponding to the ribs. As a result, imbalance occurs in the flow of the molten metal inside the mold, and there is a risk of cavities occurring in the case after molding. If cavities occur, the yield of cases decreases.

In light of that, there is a demand to provide a case that reduces the occurrence of cavities and improves yield.

The case of an embodiment of the present disclosure is a case that houses a drive force transmission device, including: a circular ring part that forms an opening through which a shaft that transmits a drive force is inserted, a plurality of fastening boss parts provided around the circular ring part, to which fastening members are secured, first ribs that, when viewed from the axial direction of the shaft, are formed between a portion of the fastening boss parts among the plurality of fastening boss parts and the circular ring part, a non-fastening boss part that, when viewed from the axial direction, is provided between the plurality of other fastening boss parts among the plurality of fastening boss parts to which the first ribs are not connected, and to which the fastening member is not secured, and a second rib that is formed between the non-fastening boss part and the circular ring part.

According to an embodiment of the present disclosure, it is possible to provide a case that reduces the occurrence of cavities and improves yield.

DETAILED DESCRIPTION OF EMBODIMENTS

Figure 1:
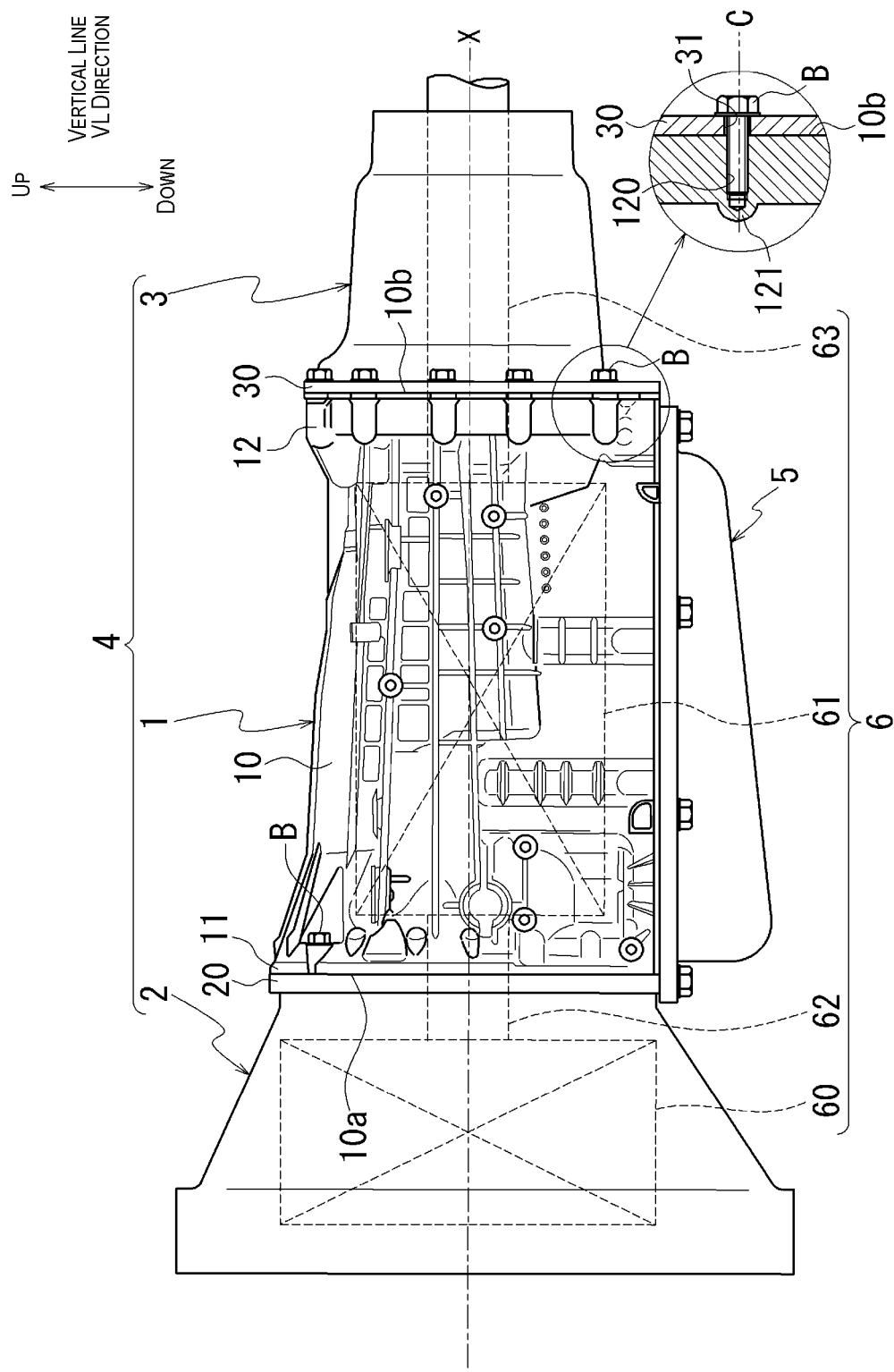
FIG. 1 is a drawing for explaining an automatic transmission case.
Figure 2:
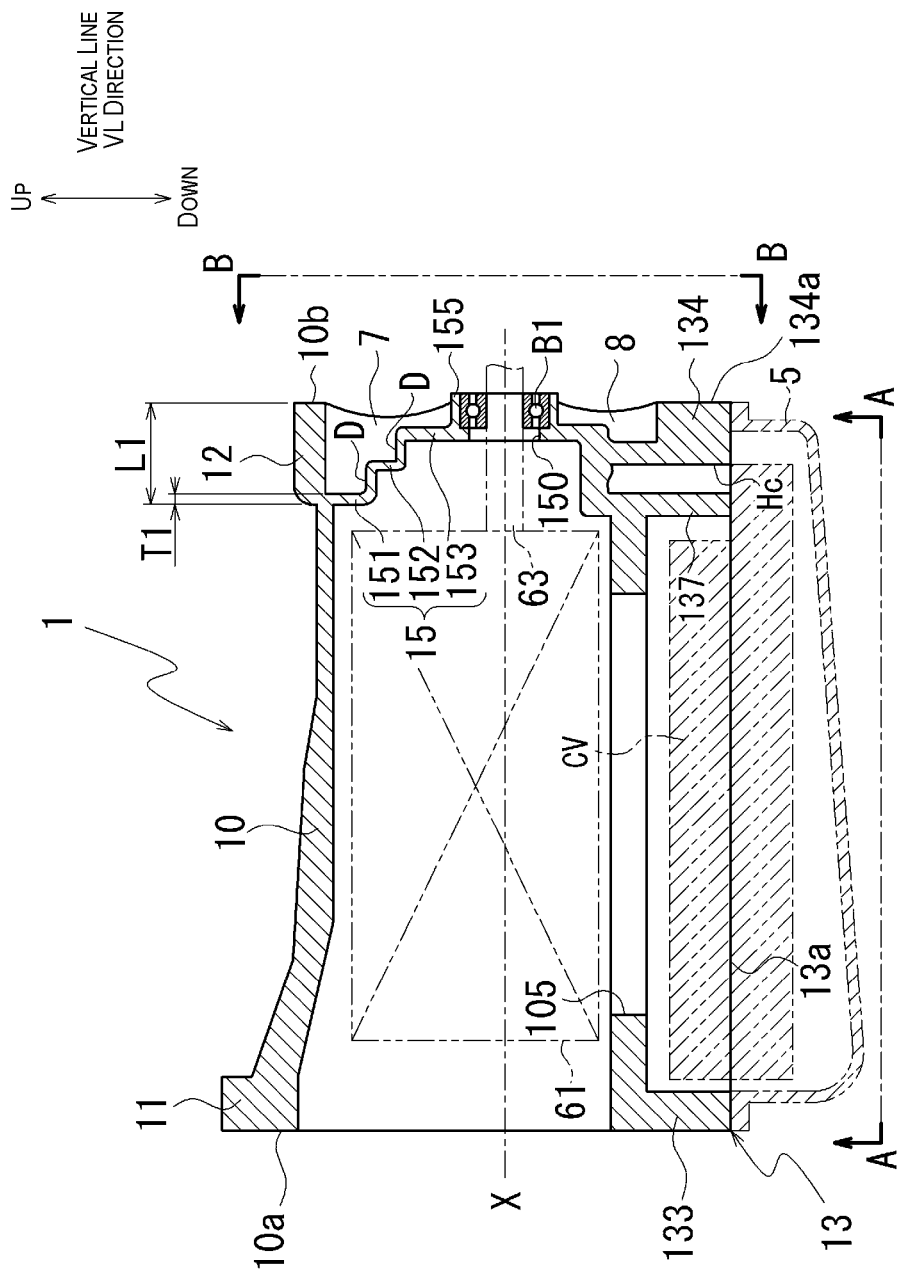
FIG. 2 is a drawing for explaining a transmission case.
Figure 3:
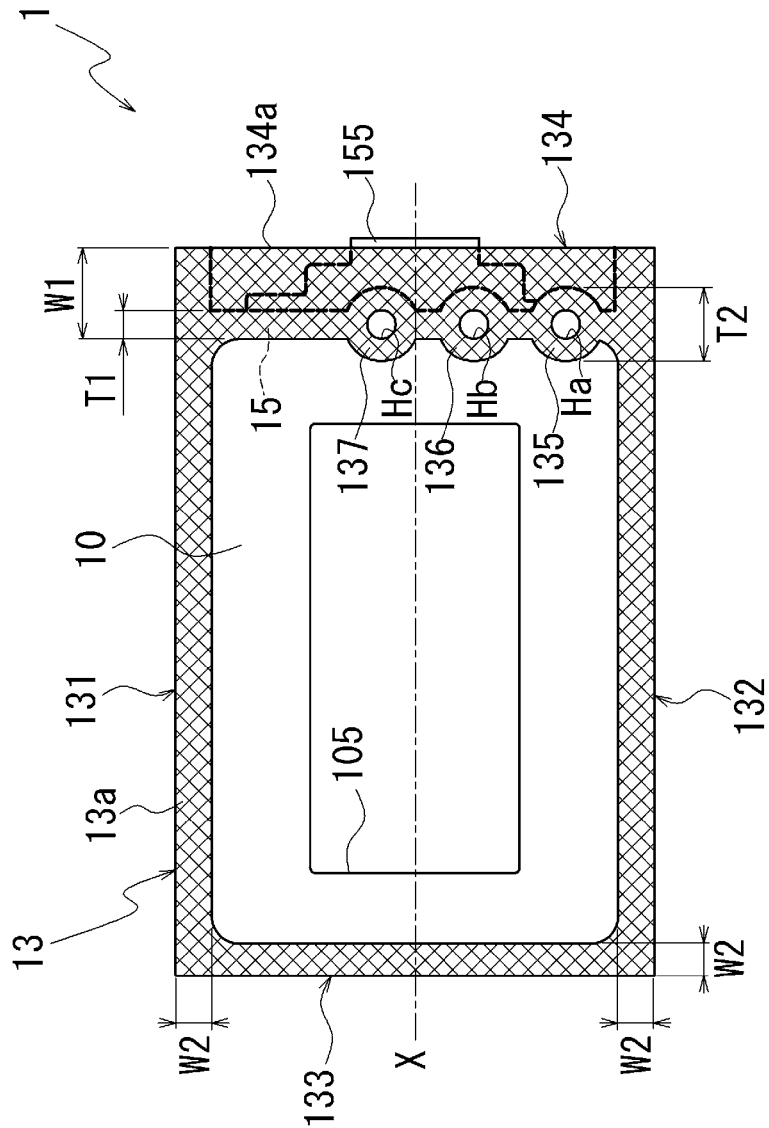
FIG. 3 is a drawing for explaining the transmission case.
Figure 4:
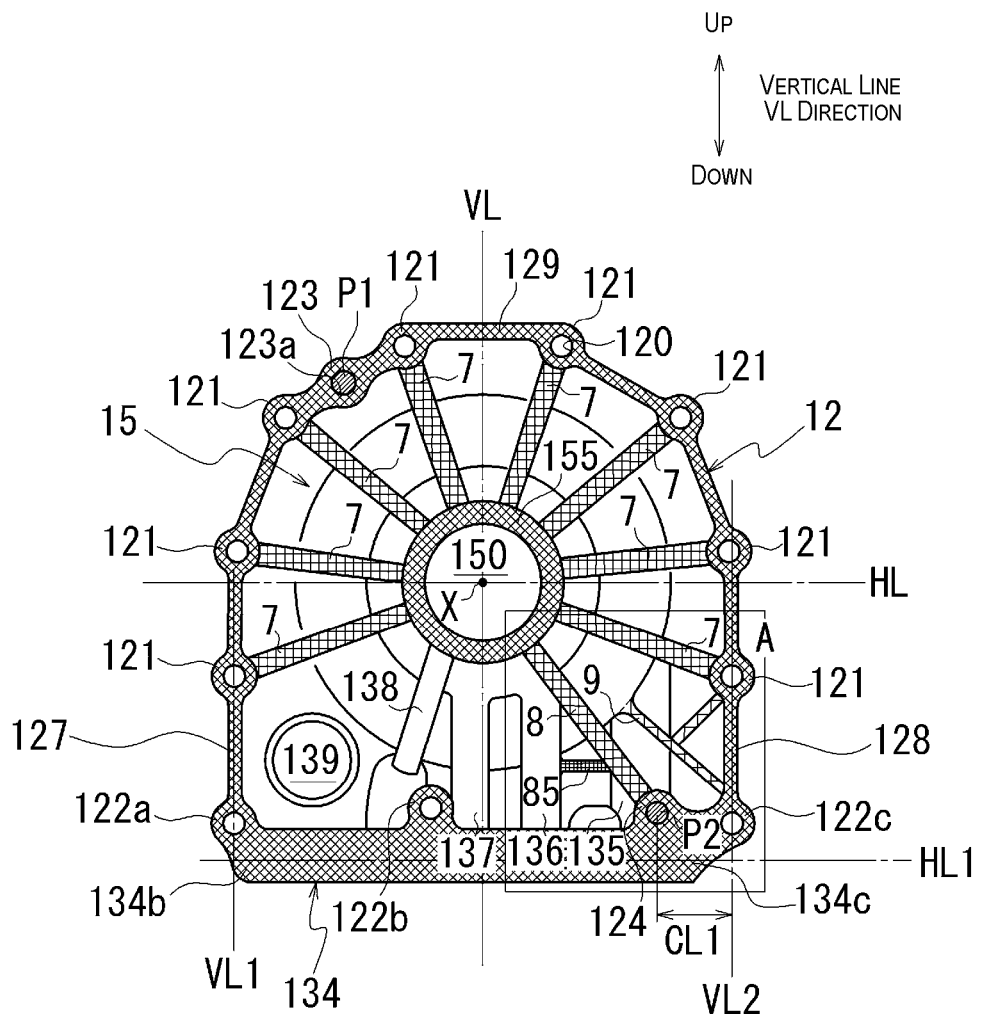
FIG. 4 is a drawing for explaining the transmission case.
Figure 5:
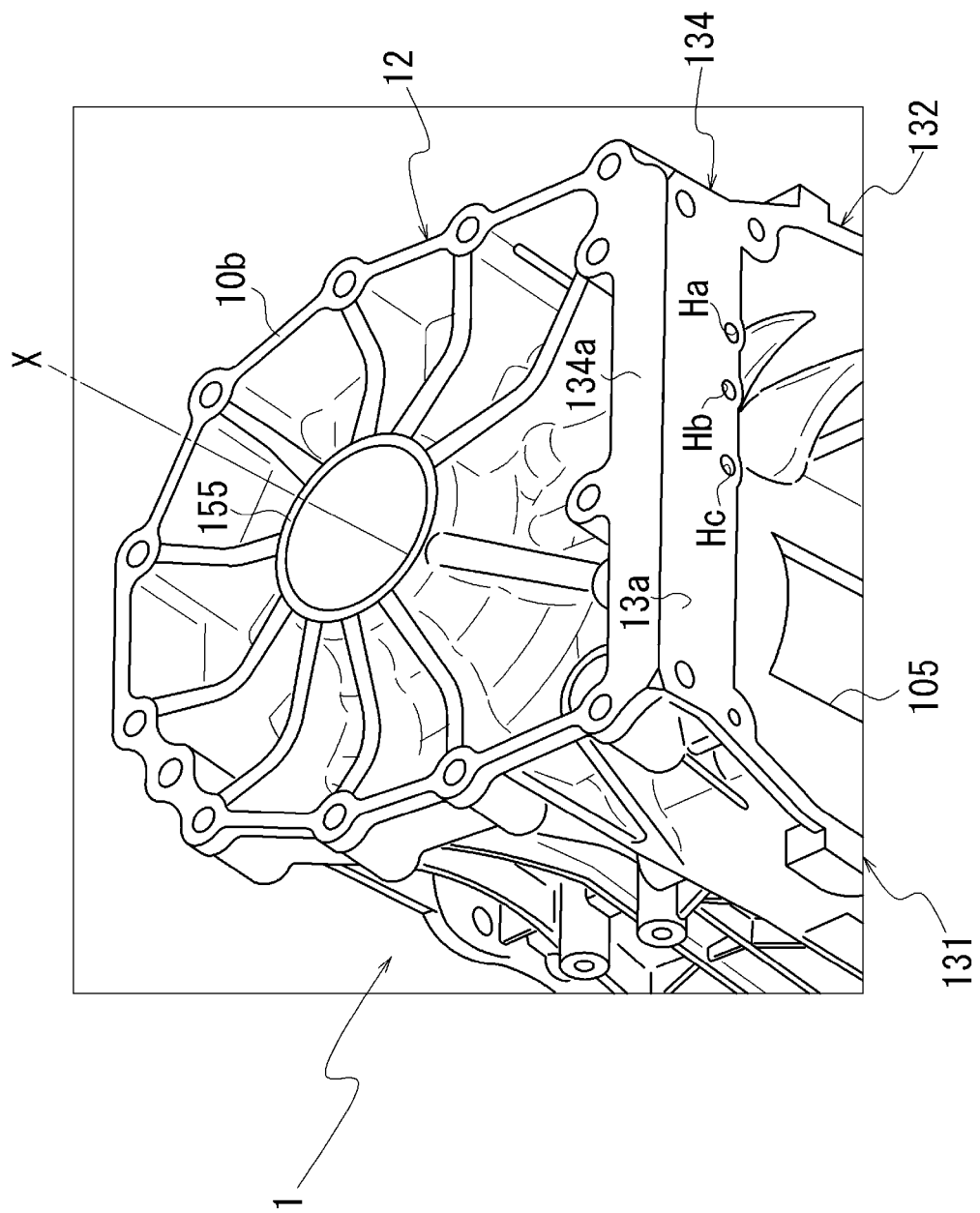
FIG. 5 is a drawing for explaining the transmission case.
Figure 6:
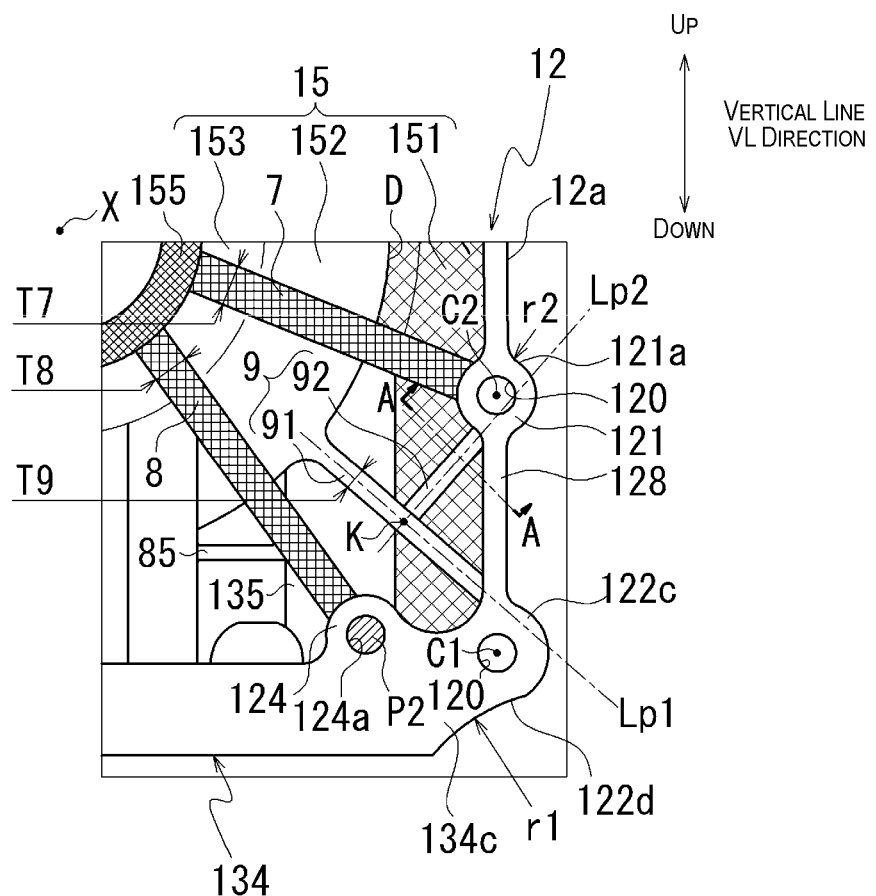
FIG. 6 is an enlarged view of the main parts of the transmission case.
Figure 7:
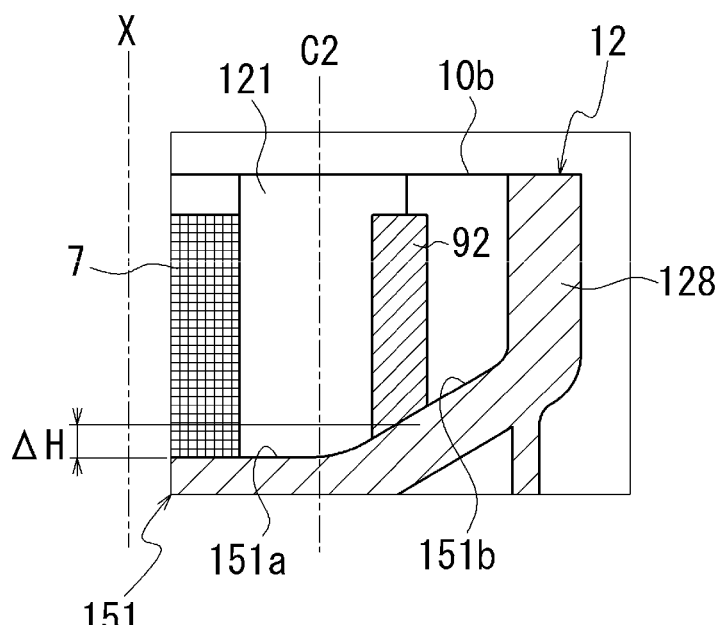
FIG. 7 is a drawing for explaining the ribs.

Hereafter, the present embodiment is explained.
FIG. 1 is a drawing for explaining an automatic transmission case 4.
FIG. 2 is a drawing for explaining a transmission case 1. In FIG. 2, the transmission case 1 is shown in cross section, and a transmission 61, an output shaft 63, a control valve CV, and an oil pan 5 are shown using virtual lines.
FIG. 3 is a drawing for explaining the transmission case 1. FIG. 3 is the A-A arrow view of FIG. 2. In FIG. 3, cross hatching is applied to a lower end surface 13a of a wall part 13.
FIG. 4 is a drawing for explaining the transmission case 1. FIG. 4 is the B-B arrow view of FIG. 2. In FIG. 4, cross hatching is applied to a support part 155, a junction part 12, and ribs 7, 8.
FIG. 5 is a drawing for explaining the transmission case 1. FIG. 5 is a perspective view of the transmission case 1 seen from a cover member 3 side.
FIG. 6 is a drawing for explaining the transmission case 1. FIG. 6 is an enlarged view of region A of FIG. 4. In FIG. 6, to make it easier to understand the positional relationship, cross hatching is applied to the ribs 7, 8, the support part 155, and an outer diameter side wall part 151.
FIG. 7 is a drawing for explaining the transmission case 1. FIG. 7 is a schematic diagram of the A-A cross section of FIG. 6. In FIG. 7, cross hatching is applied to the rib 7.

As shown in FIG. 1, the automatic transmission case 4 accommodates a torque converter 60, an input shaft 62, the transmission 61, and the output shaft 63 (shaft) which are a drive force transmission device 6 (see dashed line in FIG. 1).

In the drive force transmission device 6, the torque converter 60, the input shaft 62, the transmission 61, and the output shaft 63 are provided along the output rotation transmission route around a rotation axis X of an engine (not illustrated).

In the drive force transmission device 6, the output rotation of the engine is transmitted to the transmission 61 via the input shaft 62 from the torque converter 60. The output rotation transmitted from the transmission 61 is shifted by changing the combination of engagement/release of a plurality of friction engagement elements (not illustrated) constituting the transmission 61.

The output rotation shifted by the transmission 61 is transmitted to the drive wheels of a vehicle (not illustrated) via the output shaft 63.

As shown in FIG. 1, the automatic transmission case 4 has a converter housing 2 that accommodates the torque converter 60, the transmission case 1 that accommodates the transmission 61, and the cover member 3 that accommodates the output shaft 63.

With the installation state of the automatic transmission case 4 in the vehicle as a reference, the oil pan 5 that stores lubricating oil (not illustrated) is secured to the bottom of the transmission case 1 in a vertical line VL direction (in the drawing, the up-down direction).

The transmission case 1 has a cylinder wall part 10 surrounding the rotation axis X.

The cylinder wall part 10 has junction parts 11, 12 respectively on one end 10*a* side and another end 10*b* side in the rotation axis X direction.

A junction part 20 of the converter housing 2 abuts the junction part 11 from the rotation axis X direction. These junction parts 11, 20 are linked to each other by a bolt B which is a fastening member.

As shown in the enlarged area in FIG. 1, a bolt boss 121 is provided on the junction part 12. A bolt hole 120 of the bolt boss 121 is opened at the other end 10*b* of the cylinder wall part 10. The cross section around the bolt boss 121 is shown in the enlarged area in FIG. 1.

A plurality of the bolt bosses 121 and the bolt holes 120 are formed in the circumferential direction around the rotation axis X (see FIG. 4).

As shown in FIG. 1, a junction part 30 of the cover member 3 abuts the other end 10*b* of the cylinder wall part 10 from the rotation axis X direction. The cover member 3 has a cylindrical shape. The junction part 30 is a flange surrounding the outer circumference of the cover member 3.

As shown in FIG. 1, through holes 31 that penetrate in the rotation axis X direction are formed on the junction part 30 of the cover member 3. The transmission case 1 and the cover member 3 are secured to each other by screwing in the bolts B from the cover member 3 side in a state with the center lines of the through holes 31 of the junction part 30 matched to center lines C of the bolt holes 120 of the junction part 12.

As shown in FIG. 2, a wall part 15 is provided extending to the inner diameter side on the other end 10*b* side of the cylinder wall part 10. The wall part 15 is provided in a direction orthogonal to the rotation axis X.

The cylinder wall part 10 accommodates the transmission 61 in the interior space on the one end 10*a* side from the wall part 15 in the rotation axis X direction (see virtual lines in the drawing). In the cylinder wall part 10, the region on the other end 10*b* side from the wall part 15 in the rotation axis X direction serves as the junction part 12 with the cover member 3 (see FIG. 1).

An opening 150 is formed in a region intersecting with the rotation axis X of the wall part 15. The output shaft 63 (see virtual lines in the drawing) is inserted through the opening 150. The output shaft 63 crosses the wall part 15 from the one end 10*a* side of the cylinder wall part 10 to the other end 10*b* side.

The support part 155 that surrounds the opening 150 is provided on the surface of the wall part 15 on the other end 10*b* side (right side in the drawing) of the cylinder wall part 10. The support part 155 protrudes in a direction away from the wall part 15 in the rotation axis X direction. As shown in FIG. 4, the support part 155 has a circular ring shape when viewed from the rotation axis X direction. Specifically, the support part 155 constitutes a circular ring part.

As shown in FIG. 2, a bearing B1 is provided on the inner circumference of the support part 155. The outer circumference of the output shaft 63 is supported by the support part 155 via the bearing B1.

The wall part 15 bulges in a direction gradually approaching the other end 10*b* side of the cylinder wall part 10 in the rotation axis X direction as it goes from the outer diameter side of the rotation axis X toward the inner diameter side.

In specific terms, the wall part 15 is provided with the outer diameter side wall part 151 connected to the cylinder wall part 10 at the radial outer diameter side of the rotation axis X, an inner diameter side wall part 153 connected to the support part 155 on the radial inner diameter side of the rotation axis X, and a connection wall part 152 that connects the outer diameter side wall part 151 and the inner diameter side wall part 153.

In the rotation axis X direction, the inner diameter side wall part 153 is offset more to the other end 10*b* side of the cylinder wall part 10 in the rotation axis X direction than the outer diameter side wall part 151. The connection wall part 152 is positioned between the outer diameter side wall part 151 and the inner diameter side wall part 153 in the rotation axis X direction. The connection wall part 152 is connected to the outer diameter side wall part 151 and the inner diameter side wall part 153 respectively via step parts D, D.

In the present embodiment, the outer diameter side wall part 151, the connection wall part 152, and the inner diameter side wall part 153 have the thickness of the portion extending along the radial direction of the rotation axis X set to T1. The thickness T1 is the thickness in the rotation axis X direction. The thickness T1 of the outer diameter side wall part 151, the connection wall part 152, and the inner diameter side wall part 153 may be different from each other.

As shown in FIG. 2, the wall part 13 is provided on the bottom of the cylinder wall part 10 in the vertical line VL direction. The wall part 13 is formed integrally with the cylinder wall part 10. The wall part 13 extends in the direction away from the cylinder wall part 10 along the vertical line VL direction.

As shown in FIG. 3, when the transmission case 1 is viewed from below in the vertical line VL direction, the wall part 13 has substantially a rectangular shape. The wall part 13 is configured from long wall parts 131, 132 provided facing along the rotation axis X and short wall parts 133, 134 that connect the end parts of these long wall parts 131, 132 to each other. The region surrounded by the long wall parts 131, 132 and the short wall parts 133, 134 constitutes the bottom opening of the transmission case 1.

As shown in FIG. 2, a communication hole 105 that communicates between the interior and exterior of the cylinder wall part 10 is formed in the region surrounded by the wall part 13 in the cylinder wall part 10.

As shown in FIG. 3, when viewed from below the cylinder wall part 10, the communication hole 105 is formed inside the region surrounded by the wall part 13.

As shown in FIG. 2, the oil pan 5 is joined to the lower end surface 13*a* of the wall part 13. The control valve CV is accommodated in the space surrounded by the wall part 13 and the oil pan 5 (see virtual lines in FIG. 2).

As shown in FIG. 3, the short wall part 134 has a width W1 that is substantially consistent with a length L1 of the junction part 12 (see FIG. 2) in the rotation axis X direction. A width W2 of the long wall parts 131, 132 and the short wall part 133 is narrower than the width W1 of the short wall part 134 (W2<W1). An outer wall surface 134a of the short wall part 134 is orthogonal to the rotation axis X, and is flush with the other end 10b of the cylinder wall part 10 (see FIG. 2, FIG. 5).

As shown in FIG. 3 and FIG. 5, three oil passages Ha, Hb, Hc are opened on the lower end surface 13a on the short wall part 134 side of the wall part 13. The oil passages Ha, Hb, Hc are aligned along the direction intersecting with the rotation axis X.

As shown in FIG. 2, the oil passage Hc is provided facing along the vertical line VL direction inside the wall part 15. The lower end in the vertical line VL direction is in communication with an oil passage (not illustrated) provided in the control valve CV. The top end of the oil passage Hc is in communication with a case-internal oil passage (not illustrated) that passes through the inside of the transmission case 1. In FIG. 2, the oil passage Hc is illustrated, but oil passages Ha, Hb are also the same.

As shown in FIG. 3, thick parts 135, 136, and 137 for which the thickness in the rotation axis X direction has been increased are provided in the region through which the oil passages Ha, Hb, Hc pass in the wall part 15. A thickness T2 in the thick parts 135, 135, 137 in the rotation axis X direction is thicker than the thickness T1 of the wall part 15 (T2>T1). The thick parts 135, 136, 137 bulge from the surfaces of one side and the other side of the wall part 15 in the rotation axis X direction.

As shown in FIG. 4, the thick parts 135, 136, 137 bulge to the paper surface front side from the wall part 15 in the region below a horizontal line HL through which the rotation axis X passes.

A thick part 138 is provided at a position adjacent to the thick part 137 in the wall part 15 in the circumferential direction around the rotation axis X. The thick part 138 also bulges to the paper surface front side from the wall part 15.

The thick part 138 extends in the rotation axis X radial direction. An oil passage (not illustrated) passes through the interior of the thick part 138. The oil passage inside the thick part 138 communicates between the opening 150 and the accommodation space of the control valve CV (see FIG. 2).

Furthermore, a through hole 139 is provided at a position adjacent to the thick part 138 in the wall part 15 in the circumferential direction around the rotation axis X. The through hole 139 penetrates the wall part 15 in the rotation axis X direction. A harness of electrical equipment, etc., (not illustrated) is inserted through the through hole 139.

Here, as shown in FIG. 4, when the transmission case 1 is viewed from the cover member 3 side, the short wall part 134 extends facing along a straight line HL1 parallel to the horizontal line HL.

As shown in FIG. 4 and FIG. 5, the junction part 12 of the transmission case 1 is connected to the short wall part 134. In specific terms, as shown in FIG. 4, the junction part 12 has parallel walls 127, 128 extending along straight lines VL1, VL2 below the horizontal line HL. The straight lines VL1, VL2 are straight lines parallel to the vertical line VL that passes through the rotation axis X. The lower ends of the parallel walls 127, 128 are respectively connected to one end part 134b and another end part 134c of the short wall part 134 in the straight line HL1 direction.

The junction part 12 has an arc-shaped wall 129 that surrounds the support part 155 above the horizontal line HL that passes through the rotation axis X. Both ends of the arc-shaped wall 129 in the circumferential direction around the rotation axis X are connected to the top ends of the parallel walls 127, 128. Viewed from the rotation axis X direction, the junction part 12 (arc-shaped wall 129, parallel walls 127, 128) and the short wall part 134 form one continuous wall surrounding the support part 155.

As shown in FIG. 4, the plurality of bolt bosses 121 are provided on the junction part 12. The plurality of bolt bosses 121 are provided on the junction part 12 at intervals in the circumferential direction around the rotation axis X. As shown in FIG. 6, viewed from the rotation axis X direction, the bolt bosses 121 bulge to the radial outer diameter side of the rotation axis X from an outer peripheral surface 12a of the junction part 12. The bolt bosses 121 bulge smoothly from the outer peripheral surface 12a via an arc-shaped recess 121a. Viewed from the rotation axis X direction, the curvature radius of the recess 121a is r2.

As shown in FIG. 4, a bolt boss 122a is provided on the one end part 134b of the short wall part 134 in the straight line HL1 direction. A bolt boss 122c is provided on the other end part 134c of the short wall part 134. A bolt boss 122b is provided between the one end part 134b and the other end part 134c of the short wall part 134.

The parallel wall 127 of the junction part 12 and the one end part 134b of the short wall part 134 are connected via the bolt boss 122a. The parallel wall 128 of the junction part 12 and the other end part 134c of the short wall part 134 are connected via the bolt boss 122c.

As shown in FIG. 6, an arc-shaped recess 122d recessed to the radial inner diameter side is formed on the outer peripheral surface of the portion at which the bolt boss 122c and the short wall part 134 are continuous. Viewed from the rotation axis X direction, a curvature radius r1 of the recess 122d is larger than the curvature radius r2 of the recess 121a (r1>r2).

As shown in FIG. 4, the bolt holes 120 having a common hole diameter are formed on the plurality of bolt bosses 121 and three bolt bosses 122a, 122b, and 122c. The cover member 3 is secured to the bolt bosses 122a to 122c by screwing in the bolts B (see FIG. 1). Specifically, the plurality of bolt bosses 121 and the three bolt bosses 122a to 122c constitute a plurality of fastening boss parts to which the bolts B, which are fastening members, are secured.

A pin boss 123 is provided on the arc-shaped wall 129 of the junction part 12 at one location between bolt bosses 121, 121 adjacent in the circumferential direction. A pin hole 123a (recess) is formed on the pin boss 123. A pin P1 for positioning is inserted in the pin hole 123a.

As shown in FIG. 4, a pin boss 124 is provided on the other end part 134c side in the short wall part 134. As shown in FIG. 6, a pin hole 124a (recess) is formed in the pin boss 124. A pin P2 for positioning is inserted in the pin hole 124a.

In FIG. 4 and FIG. 6, hatching is applied to pins P1, P2. Examples of the pins P1, P2 include well-known positioning pins such as knock pins, parallel pins, etc. The diameter of the pins P1, P2 may be the same or may be different. Specifically, the pin bosses 123, 124 constitute a non-fastening boss part to which the bolts B which are fastening members are not secured.

As shown in FIG. 4, the pin boss 124 is provided at a position offset by a distance CL1 in the straight line HL1 direction to the bolt boss 122b side from the bolt boss 122c. The pin boss 124 is continuous with the bolt boss 122c.

The pin bosses 123, 124 through which the pins P1, P2 are inserted are disposed at symmetrical positions across the vertical line VL and the horizontal line HL. The transmission case 1 and the cover member 3 are secured to each other using the bolts B (see FIG. 1) after being positioned in the circumferential direction around the rotation axis X by the pins P1, P2. The transmission case 1 has ribs 7, 8, 9 for increasing the rigidity of the fixed part with the cover member 3.

[Rib 7 (First Rib)]

As shown in FIG. 4, a plurality of the ribs 7 (first ribs) are provided between the junction part 12 and the support part 155 in the radial direction of the rotation axis X. Each of the ribs 7 is provided facing along the radial direction of the rotation axis X. The ribs 7 are connected to the support part 155 on the radial inner diameter side of the rotation axis X, and are connected to the bolt bosses 121 of the junction part 12 at the radial outer diameter side of the rotation axis X. Specifically, the bolt bosses 121 constitute the portion of the fastening boss parts to which the first ribs are connected among the plurality of fastening boss parts.

As shown in FIG. 2, the ribs 7 protrude in the rotation axis X direction from the surface on the junction part 12 side of the wall part 15. The ribs 7 are provided straddling the junction part 12, the wall part 15, and the support part 155 in the radial direction of the rotation axis X.

Here, as shown in FIG. 4, the through hole 139 is provided between the support part 155 and the bolt boss 122a in the radial direction of the rotation axis X. The thick part 138 is provided between the support part 155 and the bolt boss 122b in the radial direction of the rotation axis X. Therefore, the ribs 7 are not connected to the bolt bosses 122a, 122b, respectively.

The rib 9 described later is provided between the support part 155 and the bolt boss 122c in the radial direction of the rotation axis X. The rib 9 is a rib that differs from the ribs 7. Specifically, the ribs 7 which are the first ribs are not connected to the bolt bosses 122a to 122c of the short wall part 134. Therefore, the bolt bosses 122a to 122c of the short wall part 134 constitute the plurality of other fastening boss parts to which the first ribs are not connected among the plurality of fastening boss parts.

[Rib 8 (Second Rib)]

As shown in FIG. 4, the rib 8 (second rib) is provided between the short wall part 134 and the support part 155 in the radial direction of the rotation axis X. The rib 8 is provided along the radial direction of the rotation axis X. As shown in FIG. 6, a width T8 of the rib 8 substantially matches a width T7 of the rib 7 (T8≈T7).

The rib 8 is connected to the support part 155 at the radial inner diameter side of the rotation axis X, and is connected to the pin boss 124 at the radial outer diameter side of the rotation axis X.

As shown in FIG. 4, the pin boss 124 is provided between bolt bosses 122b, 122c. Specifically, the pin boss 124 is provided between the plurality of other boss parts to which the ribs 7 are not connected.

As shown in FIG. 4, the rib 8 has a branched rib 85 branched from between the support part 155 and the pin boss 124 in the radial direction of the rotation axis X. The branched rib 85 extends in the straight line HL1 direction and is connected to the thick part 136.

As shown in FIG. 2, the rib 8 protrudes in the rotation axis X direction from the surface on the junction part 12 side of the wall part 15. The rib 8 is provided straddling the short wall part 134, the wall part 15, and the support part 155 in the radial direction of the rotation axis X.

[Rib 9 (Third Rib)]

As shown in FIG. 4, the rib 9 (third rib) is provided between the rib 7 and the rib 8 adjacent in the circumferential direction around the rotation axis X.

As shown in FIG. 6, the rib 9 has a radial direction wall 91 extending in the radial direction of the rotation axis X, and a circumferential direction wall 92 extending in the circumferential direction around the rotation axis X. The radial direction wall 91 connects the bolt boss 122c and the step part D between the outer diameter side wall part 151 and the connection wall part 152 in the wall part 15. The circumferential direction wall 92 connects the bolt boss 121 to which the rib 7 is connected and the radial direction wall 91.

As shown in FIG. 6, the radial direction wall 91 and the circumferential direction wall 92 have a substantially same width T9.

The width T9 of the rib 9 (radial direction wall 91, circumferential direction wall 92) is thinner than widths T7, T8 of ribs 7, 8 (T9<T7, T9<T8).

An intersection part K of the radial direction wall 91 and the circumferential direction wall 92 is positioned substantially in the middle of the bolt bosses 121, 122c in the vertical line VL direction. The rib 9 constitutes a truss structure that connects three points of the intersection part K, the bolt boss 122c, and the bolt boss 121.

As shown in FIG. 6, a straight line Lp1 along the longitudinal direction of the radial direction wall 91 connects to the bolt boss 122c by passing above a center C1 of the bolt hole 120 of the bolt boss 122c in the vertical line VL direction. A straight line Lp2 along the longitudinal direction of the circumferential direction wall 92 connects to the bolt boss 121 by passing below a center C2 of the bolt hole 120 of the bolt boss 121 in the vertical line VL direction 1.

Viewed from the rotation axis X direction, the radial direction wall 91 and the circumferential direction wall 92 are provided at positions respectively offset approaching each other in the vertical line VL direction from the center C1 of the bolt boss 122c and the center C2 of the bolt boss 121.

As shown in FIG. 6, the abovementioned thick part 135 is provided in the region in which the rib 9 is provided in the wall part 15. The thick part 135 bulges to the paper surface front side from the outer diameter side wall part 151 of the wall part 15. The circumferential direction wall 92 of the rib 9 is provided in the region avoiding the thick part 135 in the outer diameter side wall part 151.

As shown in FIG. 7, the outer diameter side wall part 151 has a bottom surface 151a orthogonal to the rotation axis X on the rib 7 side from the center C2 of the bolt boss 121 in the radial direction of the rotation axis. The outer diameter side wall part 151 has an inclined plane 151b inclined in a direction approaching the other end 10b in the rotation axis X direction on the parallel wall 128 side from the center C2 of the bolt boss 121 in the radial direction of the rotation axis X.

The inclined plane 151b is inclined in a direction approaching the other end 10b in the rotation axis X direction as it moves away from the bottom surface 151a in the radial direction of the rotation axis X.

For example, when the circumferential direction wall 92 is provided at a position overlapping the center C2, the circumferential direction wall 92 is disposed on the bottom surface 151a. In contrast to this, in the present embodiment, the circumferential direction wall 92 is provided on the inclined plane 151b offset in the radial direction of the rotation axis X from the center C2. As a result, the protrusion height of the circumferential direction wall 92 from the outer diameter side wall part 151 in the rotation axis X direction becomes shorter by ΔH. As a result, the amount of material used for forming the circumferential direction wall 92 is reduced, so it can be made lighter.

Hereafter, casting of the transmission case 1 is explained.

Figure 8:
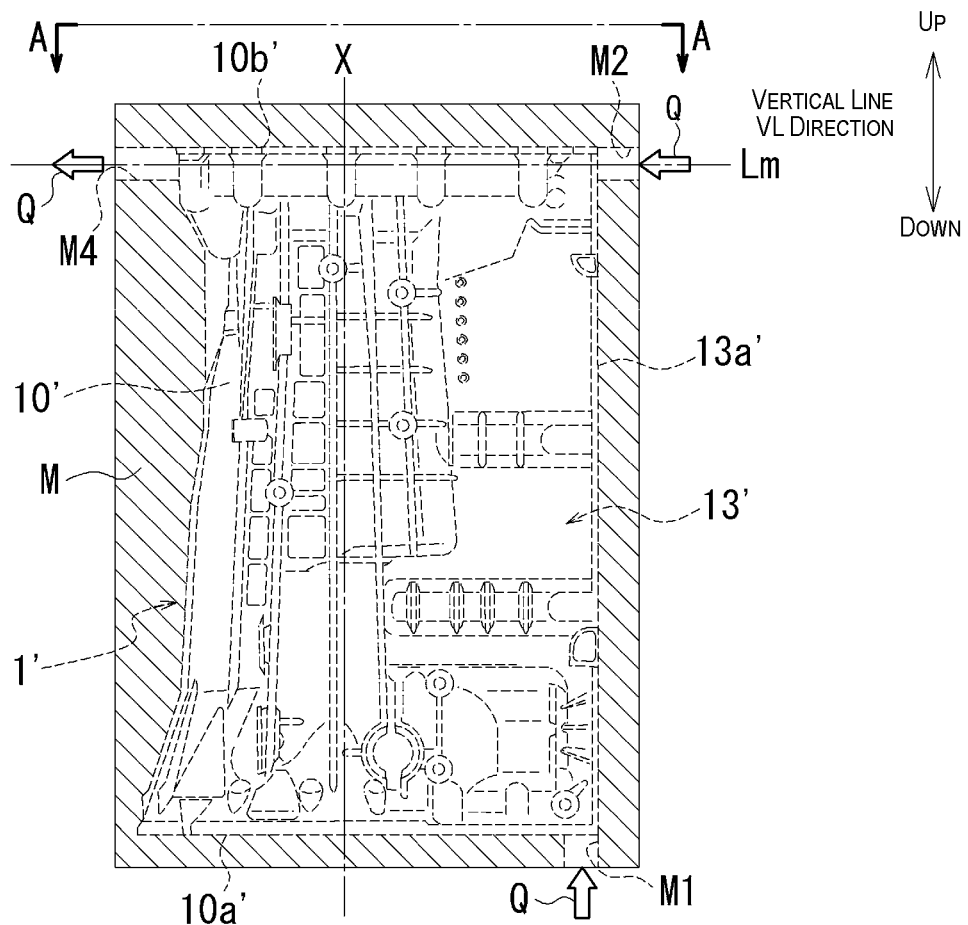
FIG. 8 is a drawing for explaining a mold.

FIG. 8 is a drawing for explaining a mold used for casting the transmission case 1.

Figure 9:
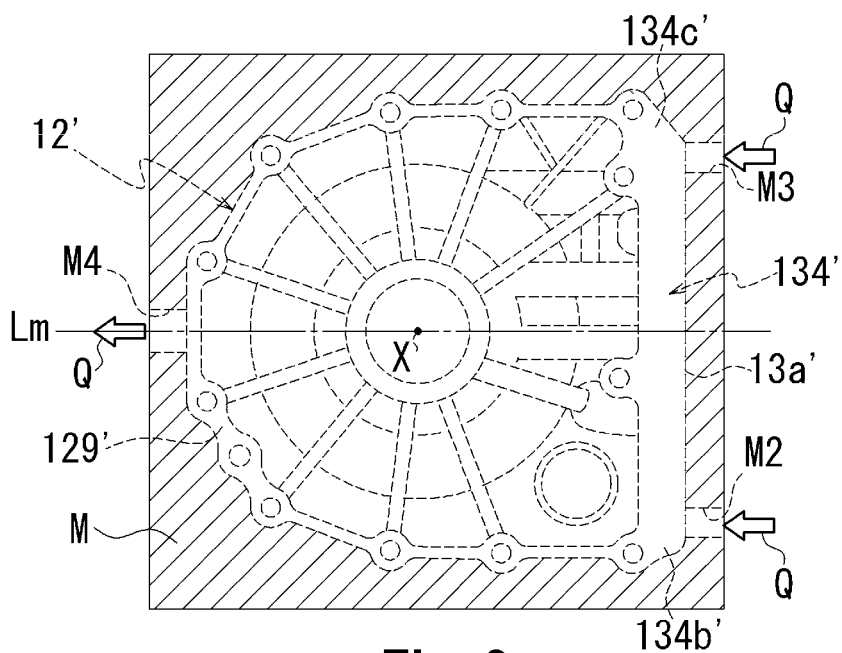
FIG. 9 is a drawing for explaining the mold.

FIG. 9 is a drawing for explaining the mold used for casting the transmission case 1. FIG. 9 is the A-A arrow view of FIG. 8.

Figure 10:
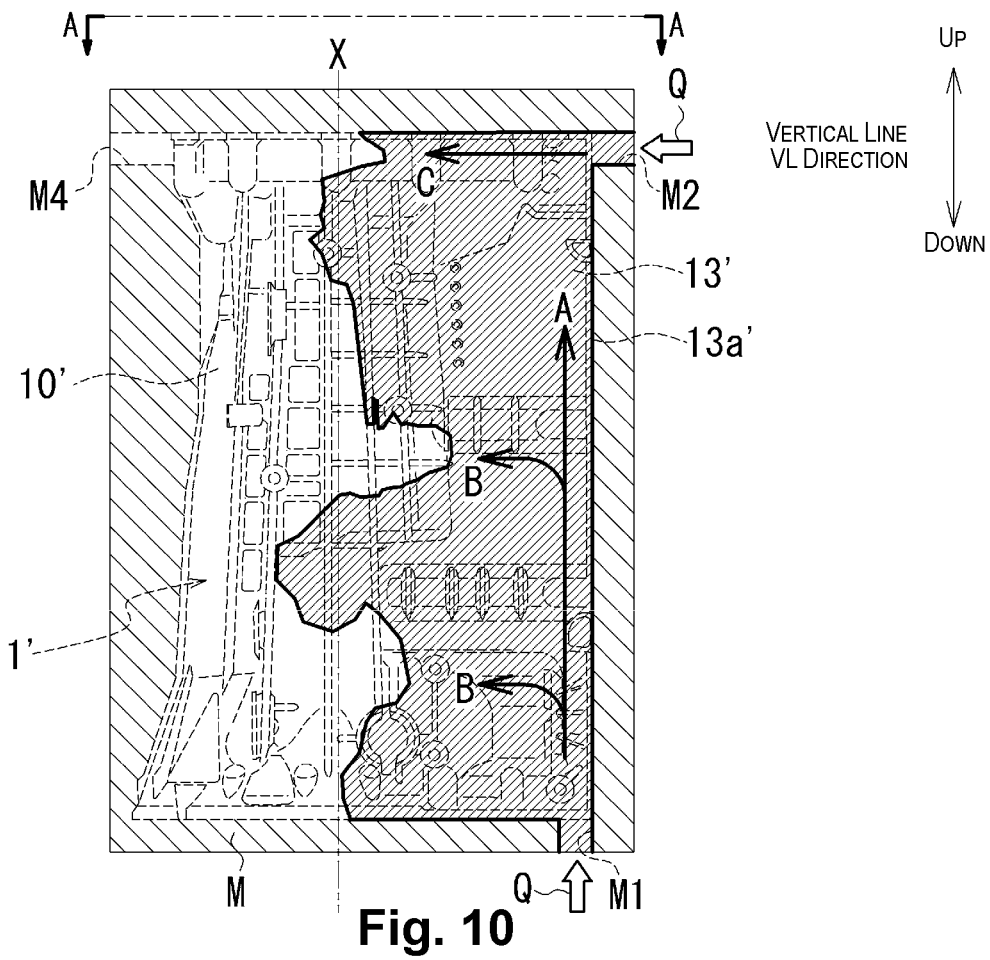
FIG. 10 is a drawing for explaining the flow of molten metal inside the mold.

FIG. 10 is a drawing for explaining the flow of a molten metal Q inside a mold M.

Figure 11:
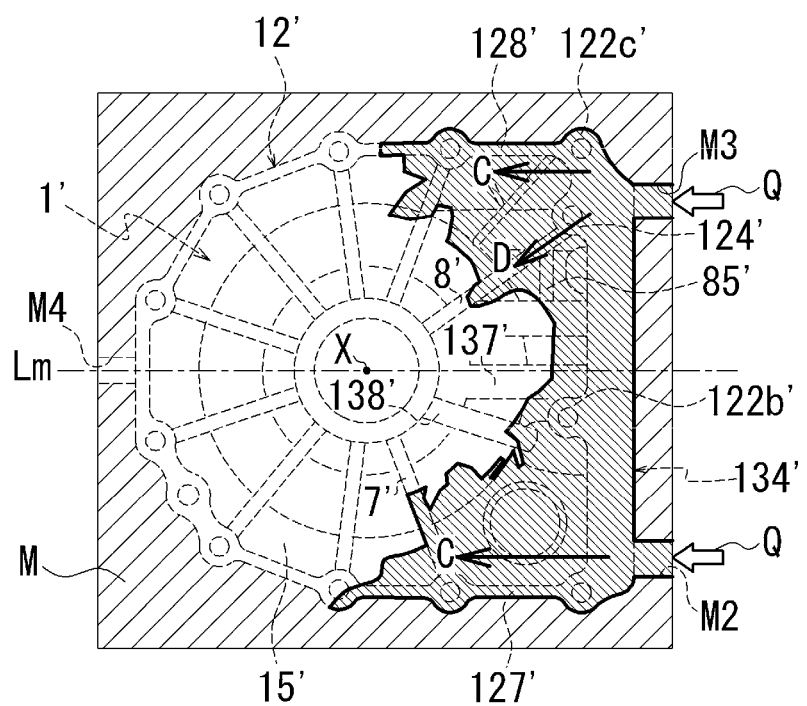
FIG. 11 is a drawing for explaining the flow of molten metal inside the mold.

FIG. 11 is a drawing for explaining the flow of the molten metal Q inside the mold M. FIG. 11 is the A-A arrow view of FIG. 10.

Figure 12:
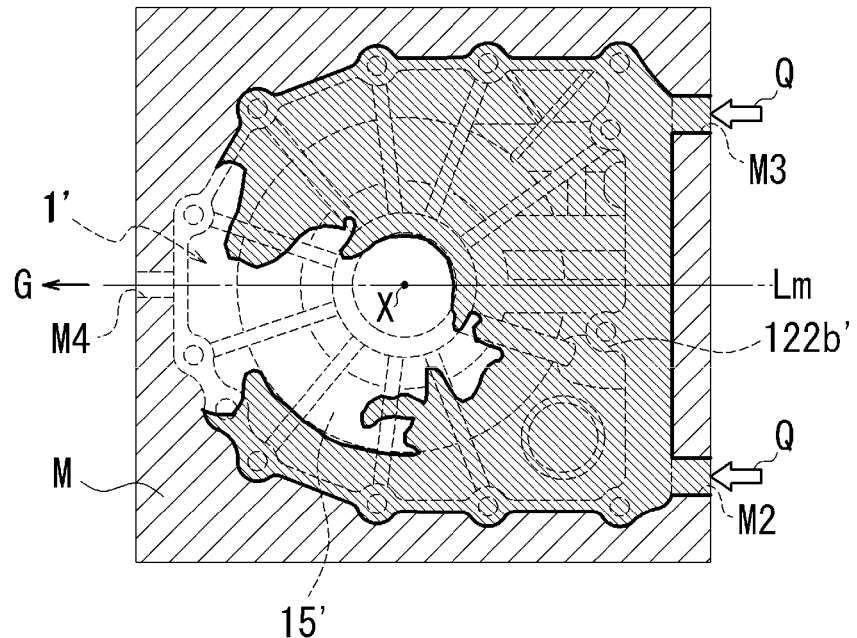
FIG. 12 is a drawing for explaining the flow of molten metal inside the mold.
Figure 13:
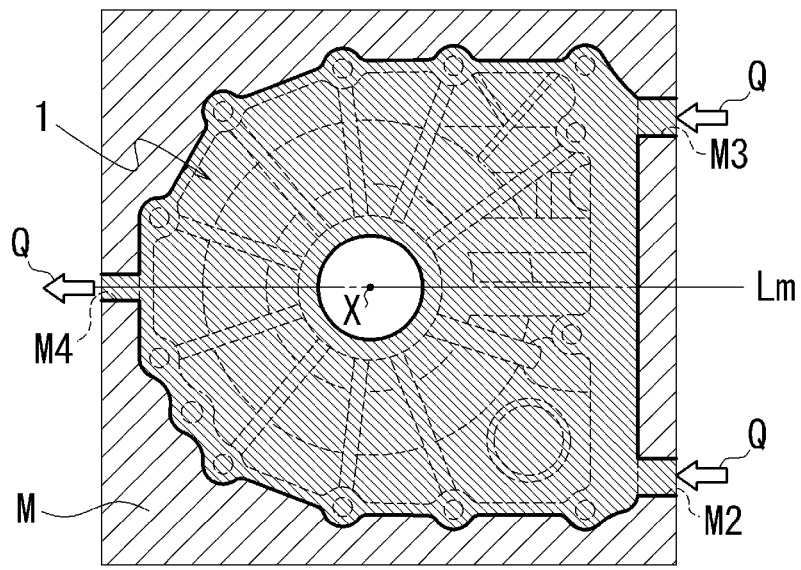
FIG. 13 is a drawing for explaining the flow of molten metal inside the mold.

FIG. 12 and FIG. 13 are drawings for explaining the flow of the molten metal Q inside the mold M in sequence.

In FIG. 8 to FIG. 13, the interior space of the mold M corresponding to the shape of the transmission case 1 is shown by dashed lines. In FIG. 10 to FIG. 13, hatching is applied to the region inside the mold M to which the molten metal Q is supplied.

The transmission case 1 is manufactured by casting by flowing the molten metal Q into the mold M. The molten metal Q component is a magnesium alloy.

The mold M has an interior space corresponding to the shape of the transmission case 1 (transmission case 1', see dashed lines in FIG. 8). In the explanation hereafter, "'" is added to the notation of the code of the part corresponding to each part of the transmission case 1 in the interior space of the mold M.

As shown in FIG. 8, the mold M is disposed with the rotation axis X along the vertical line VL direction.

In specific terms, in the transmission case '1, another end 10b' side of a cylinder wall part 10' is disposed on the upper side in the vertical line VL direction, and one end side 10a' side is disposed on the lower side of the vertical line VL direction.

In the transmission case 1', a lower end surface 13a' of a wall part 13' is disposed at one end face side (right side in the drawing) in the radial direction of the rotation axis X.

As shown in FIG. 8 and FIG. 9, entry ports M1, M2, M3 for the molten metal Q are provided at three locations and outlet port M4 for the molten metal Q is provided at one location in the mold M. The entry ports M1, M2, M3 and the outlet port M4 are through holes that communicate between the interior and exterior of the mold M.

As shown in FIG. 8, the entry port M1 is connected to the wall part 13' at the lower side (one end 10a' side) of the mold M in the vertical line VL direction. The entry port M1 is provided in a direction along the rotation axis X.

As shown in FIG. 8, the entry port M2 is connected to the lower end surface 13a' of the wall part 13' at the upper side (other end 10b' side) of the mold M in the vertical line VL direction. The entry port M2 is provided in a direction along the straight line Lm that crosses the rotation axis X from the one side (wall part 13') to the other side (cylinder wall part 10').

As shown in FIG. 9, the entry port M2 is connected to a one end part 134b' of a short wall part 134'.

As shown in FIG. 9, the entry port M3 is connected to another end part 134c' of the short wall part 134'. The entry port M3, the same as entry port M2, is provided in a direction along the straight line Lm that crosses the rotation axis X from one side to the other side. The entry port M3 is provided at the same position as the entry port M2 (see FIG. 8) in the vertical line VL direction, and is connected to the lower end surface 13a'.

As shown in FIG. 8, the outlet port M4 is provided at the opposite side to the wall part 13' across the rotation axis X at the upper side (other end 10b' side) of the mold M in the vertical line VL direction. The outlet port M4 is provided in a direction along the straight line Lm.

In specific terms, as shown in FIG. 9, the outlet port M4 is connected to the intersection point of an arc-shaped wall 129' of a junction part 12' and the straight line Lm. As shown in FIG. 8 and FIG. 9, a case when the mold M has the entry ports M1, M2, M3 for the molten metal Q at three locations was explained as embodiments of the present invention, but the present invention is not limited only to a mode showing these embodiments, and it is also possible to further provide one or a plurality of entry ports between the entry port M1 and the entry port M2, or between the entry port M1 and the entry port M3 according to the requirements for casting.

The effects of the transmission case 1 of this configuration are explained.

As shown in FIG. 10 and FIG. 11, the molten metal Q is injected from entry ports M1 to M3 in the space inside the mold M (transmission case 1'). Most of the molten metal Q first flows in a direction along the injection direction of the molten metal Q inside the transmission case 1'.

As shown in FIG. 10, most of the molten metal Q injected from the entry port M1 flows along the wall part 13' in the rotation axis X direction (arrow A). As a result, around the wall part 13' is filled with the molten metal Q. Thereafter, the molten metal Q flows to the cylinder wall part 10' side (arrow B) from the wall part 13' side along the radial direction of the rotation axis X.

As shown in FIG. 10, the molten metal Q injected from the entry port M2 flows to the cylinder wall part 10' side from the wall part 13' side (arrow C) along the radial direction of the rotation axis X. The molten metal Q injected from the entry port M3 similarly flows in the arrow C direction (see FIG. 11).

As shown in FIG. 11, immediately after being supplied from entry ports M2, M3, the molten metal Q is first filled in the short wall part 134'. Thereafter, it flows from the short wall part 134' to the junction part 12', a wall part 15', and ribs 7', 8'.

Here, with the transmission case 1, the thickness (W1, L1) of the short wall part 134, the junction part 12, and the ribs 7, 8 in the rotation axis X direction is thicker than the thickness T1 of the wall part 15 (see FIG. 2, FIG. 3). Specifically, in the space inside the mold M (transmission case 1'), the short wall part 134', the junction part 12', and the ribs 7', 8' have a larger cross section area as a flow path through which the molten metal Q flows than the wall part 15'.

Therefore, the molten metal Q that flows from the short wall part 134' passes more easily through parallel walls 127', 128' of the junction part 12', and the ribs 7', 8' which have a large flow path cross section area (arrows C, D in FIG. 11).

Meanwhile, since there are thick parts 137', 138', items correlating to ribs 7', 8' are not provided on a bolt boss 122b'. The bolt boss 122b' is at a position away from the entry ports M2, M3.

Therefore, though the region around the bolt boss 122b' in the wall part 15' is supplied with the molten metal Q from the short wall part 134', the supply rate of the molten metal Q is slower than with regions provided with the ribs 7', 8'. That being done, as shown in FIG. 11, inside the transmission case 1', the molten metal Q is in a state in which the region around the bolt boss 122b' in the wall part 15' is recessed in the direction away from the outlet port M4 in the straight line Lm direction.

Here, a gas G is generated from the molten metal Q. The gas G is pushed out by the molten metal Q sequentially supplied into the mold M, and exhausted from the outlet port M4 (see FIG. 12).

A detailed description will be noted later, but when a difference (imbalance) occurs in the supply rate of the molten metal Q to each part inside the mold M, the gas G is not pushed out appropriately, and casting may be done with the gas G still contained (see FIG. 17). The caught gas G appears as cavities in the transmission case after casting. The cavities occur more easily the greater the difference in the supply rate of the molten metal Q.

As shown in FIG. 4, with the transmission case 1 of the present embodiment, the rib 8 is connected to the pin boss 124. The pin boss 124 is offset by the distance CL1 to the bolt boss 122b side from the bolt boss 122c.

As shown in FIG. 11, inside the mold M, the rib 8' is disposed closer to the bolt boss 122b' than when connected to a bolt boss 122c'. As a result, it is easier to supply a portion of the molten metal Q that passes through the rib 8' to the region around the bolt boss 122b' than when the rib 8' is connected to the bolt boss 122c'. A branched rib 85' is connected to the rib 8', so supply to the region around the bolt boss 122b' is promoted more.

The bolt boss 122c and the pin boss 124 are formed continuously (see FIG. 4). As a result, the space around the boss 124' (capacity) inside the mold M is greater than when the bolt boss 122c and the pin boss 124 are provided separately, for example.

Having done that, the amount of the molten metal Q supplied to the rib 8' from the pin boss 124' increases, so supply of the molten metal Q to the region around the bolt boss 122b' in the wall part 15' is promoted.

In this way, by having the transmission case 1 have the rib 8 provided on the pin boss 124, during casting, it is possible to actively supply the molten metal Q also to the region around the bolt boss 122b' in the wall part 15' in which it is difficult to supply the molten metal Q. As a result, there is a reduction in the difference in the supply rate of the molten metal Q to each part within the mold M becoming large, and it is possible to sequentially push out the gas G generated from the molten metal Q toward the outlet port M4 side (see FIG. 12). As a result, there is a reduction in the occurrence of cavities in the transmission case 1 after casting (see FIG. 13).

COMPARISON EXAMPLE

Figure 14:
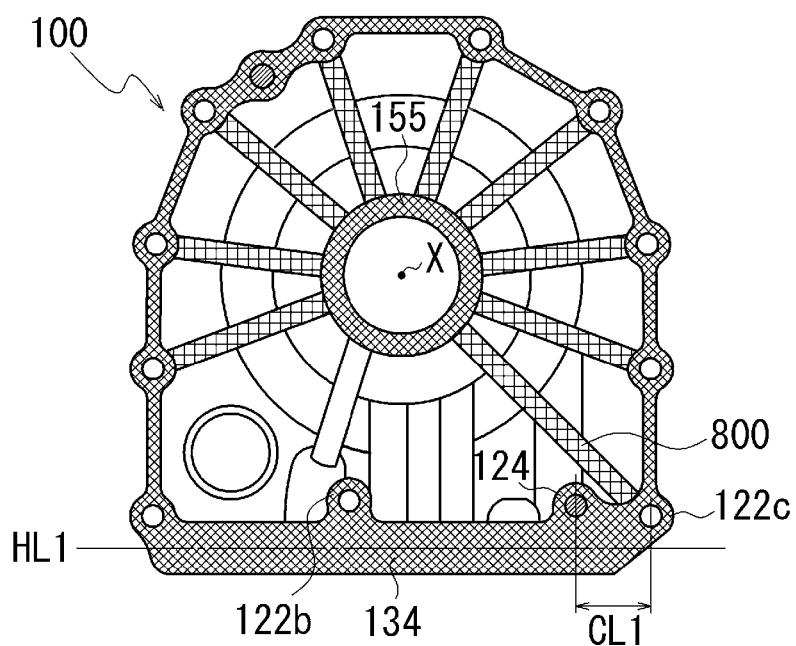
FIG. 14 is a drawing for explaining the transmission case according to a comparison example.

FIG. 14 is a drawing for explaining a transmission case 100 according to a comparison example.

Figure 15:
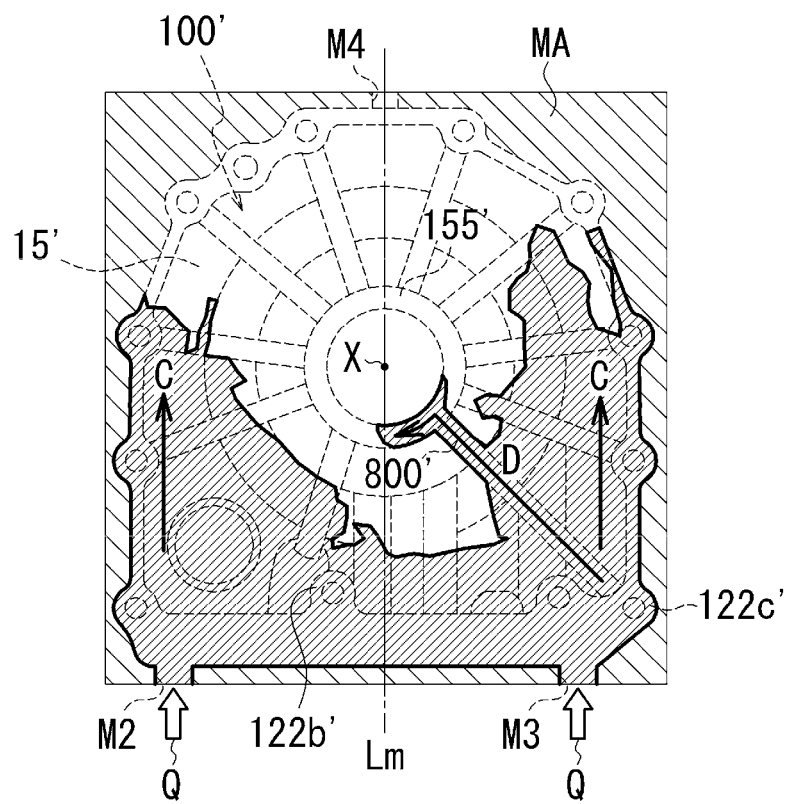
FIG. 15 is a drawing for explain the flow of molten metal inside the mold according to a comparison example.
Figure 16:
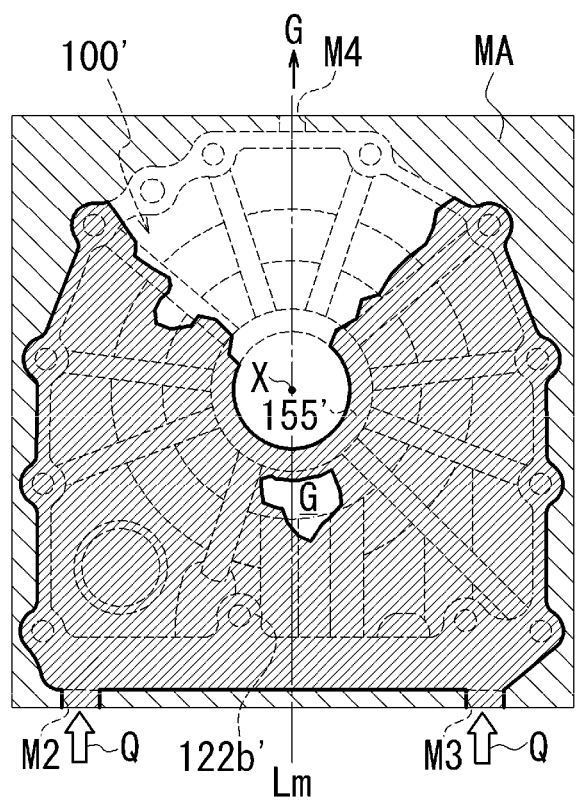
FIG. 16 is a drawing for explain the flow of molten metal inside the mold according to a comparison example.
Figure 17:
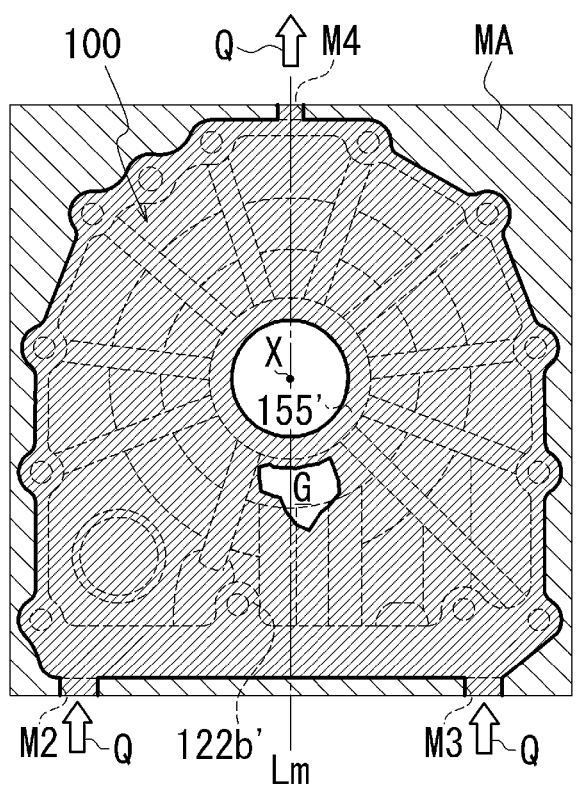
FIG. 17 is a drawing for explain the flow of molten metal inside the mold according to a comparison example.

FIG. 15 to FIG. 17 are drawings for explaining the casting of the transmission case 100 in sequence according to the comparison example. In the comparison example hereafter, only the parts that are different from the present embodiment are explained.

As shown in FIG. 14, a rib 800 of the transmission case 100 is connected to the bolt boss 122c. The rib 800 is provided at a position farther away from the bolt boss 122b than the pin boss 124 in the straight line HL1 direction by the distance CL1 for the part connected to the bolt boss 122c.

As shown in FIG. 15 to FIG. 17, the transmission case 100 is formed by flowing the molten metal Q into a mold MA. The mold MA has a space corresponding to the shape of the transmission case 100 (transmission case 100', see dashed lines in FIG. 15 to FIG. 17).

Inside the mold MA, in the transmission case 100', the supply to the region around the bolt boss 122b' in the wall part 15' is delayed by the amount that a rib 800' is separated from the bolt boss 122b'.

The molten metal Q supplied to the rib 800' from the inlet port M3 reaches a support part 155' (see arrow D in FIG. 15) before reaching the region around the bolt boss 122b' of the wall part 15'.

Having done that, the molten metal Q that reached the support part 155' first becomes a wall, and the gas G generated from the region around the bolt boss 122b' being pushed out toward the outlet port M4 side in the straight line Lm direction is inhibited, and is left behind in the mold MA. The gas G left behind in the molten metal Q in the transmission case 100 after casting appears as cavities (see FIG. 17).

With the transmission case 1 according to the present invention, by connecting the rib 8 to the pin boss 124, it becomes easier for the molten metal Q to be supplied during casting even in the region around the bolt boss 122b of the wall part 15 which is the region in which the ribs are not formed. As a result, the difference in the supply rate of the molten metal Q to each part in the mold M becomes smaller, and as with the comparison example in FIG. 15 to FIG. 17, there is a reduction in the gas G generated from the molten metal Q becoming caught.

Here, when the rib 8 is connected to the pin boss 124, the gap between the rib 8 and the rib 7 adjacent in the circumferential direction around the rotation axis X becomes broader than the transmission case 100 according to the comparison example, but by providing the rib 9, rigidity is ensured.

As shown in FIG. 6, in the transmission case 1 according to the present embodiment, the straight line Lp1 along the longitudinal direction of the radial direction wall 91 of the rib 9 is made to pass above the center C1 of the bolt hole 120 of the bolt boss 122c. As a result, the gap between the radial direction wall 91 and the short wall part 134 becomes broader. Having done that, it is possible to broaden the gap in the part configuring the radial direction wall 91 and the short wall part 134 in the mold M, so heat conveyed to the mold M from the molten metal Q can be dispersed more easily. As a result, there is a reduction in the occurrence of heat cracks with a local increase in the temperature of the mold M due to the heat of the molten metal Q.

The straight line Lp2 along the longitudinal direction of the circumferential direction wall 92 of the rib 9 is made to pass below the center C2 of the bolt hole 120 of the bolt boss 121. As a result, the gap between the circumferential direction wall 92 and the rib 7 becomes broader. Having done that, it is possible to broaden the gap in the part configuring the circumferential direction wall 92 and the rib 7 in the mold M, so heat conveyed to the mold M from the molten metal Q is dispersed more easily. As a result, there is a reduction in the occurrence of heat cracks in the mold M with a local increase of the temperature of the mold M due to the heat of the molten metal Q.

Examples of the transmission case 1 according to a mode of the present invention are listed hereafter.

(1, 2) The transmission case 1 (case) houses the transmission 61 of the drive force transmission device 6.

The transmission case 1 has the support part 155 (circular ring part) that forms the opening 150 through which the output shaft 63 (shaft) that transmits the drive force passes.

The plurality of bolt bosses 121 are provided around the support part 155.

The bolt bosses 122a, 122b, 122c are provided around the support part 155.

The bolt bosses 121, 122a, 122b, 122c are fastening boss parts.

A bolt B (fastening member) is secured to each of the bolt bosses 121, 122a, 122b, 122c.

Viewed from the rotation axis X direction (axial direction of the shaft), among the bolt bosses 121, 122a, 122b, 122c (plurality of fastening boss parts), the ribs 7 (first ribs) are formed between the bolt bosses 121 (portion of the fastening boss parts) and the support 155.

Among the bolt bosses 121, 122a, 122b, 122c, the bolt bosses 122a, 122b, 122c are the plurality of other fastening boss parts to which the ribs 7 are not connected.

The pin boss 124 is provided between the bolt bosses 122b, 122c.

The pin boss 124 is the non-fastening boss part to which the bolt B is not secured.

The pin boss 124 has the pin hole 124a (recess) in which the pin P2 for positioning is inserted.

The rib 8 (second rib) is formed between the pin boss 124 and the support 155.

By configuring in this way, it is possible to provide a transmission case 1 that reduces the occurrence of cavities and improves yield.

In specific terms, in the transmission case 1, by providing the rib 8 between the pin boss 124 and the support part 155, the rib 8 is brought closer to the bolt boss 122b. The bolt boss 122b is the fastening boss part to which the ribs 7, 8 are not connected.

As a result, during casting, the supply of the molten metal Q to the bolt boss 122b' side via the rib 8' is promoted. Having done that, the difference in the supply rate of the molten metal Q to each part within the mold M becomes smaller, and it is possible to reduce the gas G generated from the molten metal Q becoming caught. Therefore, it is possible to provide the transmission case 1 that reduces the occurrence of cavities and improves yield.

(3) Viewed from the rotation axis X direction, the pin boss 124 is provided between the lower end surface 13a (one end face) of the wall part 13 in the radial direction of the rotation axis X and the support part 155.

Casting of the transmission case 1 is done by supplying the molten metal Q from the inlet ports M1 to M3 of the mold M.

The inlet ports M1 to M3 of the molten metal Q are provided at the lower end surface 13a' side of the wall part 13' of the transmission case 1' in the radial direction of the rotation axis X.

By configuring in this way, during casting, the molten metal Q is supplied to the rib 8' via the pin boss 124' from the lower end surface 13a' side on the wall part 13'. As a result, the molten metal Q is more easily supplied also to the bolt boss 122b' side which is the fastening boss part to which the ribs 7', 8' are not connected. Having done that, the difference in the supply rate of the molten metal Q to each part in the mold M is smaller, and there is a reduction in the gas G generated from the molten metal Q becoming caught. Therefore, it is possible to provide a transmission case 1 that reduces the occurrence of cavities and improves yield.

(4) The pin boss 124 is linked to the bolt boss 122c.

The bolt boss 122c is one of the plurality of other fastening boss parts to which the ribs 7 are not connected.

By configuring in this way, by having the transmission case 1 have the pin boss 124 and the bolt boss 122c linked, it is possible to make the space in which the molten metal Q is pooled (pin boss 124', bolt boss 122c') larger in the mold M. As a result, during casting, there is a greater volume of the molten metal Q supplied via the rib 8' from the pin boss 124', and the molten metal Q is more easily supplied also to the bolt boss 122b' side. Having done that, it is possible to have the difference in supply rate of the molten metal Q to each part in the mold M be smaller, and to reduce the gas G generated from the molten metal Q becoming caught. Therefore, it is possible to reduce the occurrence of cavities.

In particular, it is possible to have the space in which the molten metal Q is pooled (pin boss 124', bolt boss 122c') be closer to the inlet port M3 in the mold M the closer the pin boss 124 is to the lower end surface 13a of the wall part 13. As a result, for example before the molten metal Q flows to the parallel wall 128' side, it can be taken into the pin boss 124' and the bolt boss 122c', so it is possible to increase the amount of the molten metal Q supplied to the rib 8'.

(5) There is the arc-shaped recess 122d in the region in which the bolt boss 122c is provided.

The bolt boss 122c is one of the plurality of other boss parts to which the ribs 7 are not connected.

There is an arc-shaped recess 121a in the region in which the bolt boss 121 is provided.

Viewed from the rotation axis X direction, the radius r1 of the recess 122d is larger than the radius r2 of the recess 121a.

By configuring in this way, in the bolt boss 122c to which the rib 7 is not connected, it is possible to reduce the stress concentration when twisting occurs between it and the cover member 3. As a result, it is possible to prevent cracking of the transmission case 1 due to stress concentration. Meanwhile, padding is reduced in the bolt bosses 121 to which the ribs 7 are connected, so it is possible to reduce the overall weight of the transmission case 1 from becoming heavy.

(6) The rib 9 (third rib) is provided between the rib 7 and the rib 8 adjacent in the circumferential direction around the rotation axis X.

The gap between ribs 7, 8 adjacent in the circumferential direction around the rotation axis X is broader than the gap between ribs 7, 7 adjacent in the circumferential direction around the rotation axis X.

In light of that, by configuring as noted above, by providing the rib 9 around the bolt boss 122c in which the ribs 7, 8 are not provided, it is possible to ensure rigidity strength around the bolt boss 122c.

(7) The rib 9 cross section is a truss structure when viewed from the rotation axis X direction.

By configuring in this way, it is possible to improve surface strength compared to simply providing one rib on the bolt boss 122c.

(8) The rib 9 has the radial direction wall 91 extending to the radial inner diameter side from the bolt boss 122c, and the circumferential direction wall 92 that connects the radial direction wall 91 and the bolt boss 121 in the circumferential direction.

The rib 9 constitutes a truss structure by connecting the three points of the intersection part K between the radial direction wall 91 and the circumferential direction wall 92, the bolt boss 122c, and the bolt boss 121.

By configuring in this way, it is possible to distribute the stress between the radial direction wall 91, the circumferential direction wall 92, and the parallel wall 128.

(9) In the radial direction wall 91, the straight line Lp1 along the longitudinal direction passes above the center C1 of the bolt boss 122c in the vertical line VL direction.

In the circumferential direction wall 92, the straight line Lp2 along the longitudinal direction passes below the center C2 of the bolt boss 121 in the vertical line VL direction.

Specifically, viewed from the rotation axis X, the radial direction wall 91 and the circumferential direction 92 are provided at positions respectively offset in the direction approaching each other in the vertical line VL direction from the center C1 of the bolt boss 122c and the center C2 of the bolt boss 121.

By configuring in this way, the radial direction wall 91 and the circumferential direction wall 92 are respectively disposed at positions away from the short wall part 134 and the ribs 7.

Having done that, it is possible to make the gap of the part corresponding to the radial direction wall 91 and the short wall part 134 in the mold M and the gap of the part corresponding to the circumferential direction wall 92 and the rib 7 broader, so it is easier to disperse heat conveyed to the mold M from the molten metal Q. As a result, there is a reduction in the occurrence of heat cracks with a local increase in the mold M temperature due to the heat of the molten metal Q.

As shown in FIG. 7, the outer diameter side wall part 151 has the bottom surface 151a orthogonal to the rotation axis X at the rib 7 side from the center C2 of the bolt boss 121 in the radial direction of the rotation axis X. The outer diameter side wall part 151 has the inclined plane 151b that is inclined in the direction approaching the other end 10b in the rotation axis X direction at the parallel wall 128 side from the center C2 of the bolt boss 121 in the radial direction of the rotation axis X. The inclined plane 151b is inclined in the direction approaching the other end 10b in the rotation axis X direction as it moves away from the bottom surface 151a in the radial direction of the rotation axis X.

In light of that, by configuring as described above, by offsetting the circumferential direction wall 92 in the radial direction of the rotation axis X from the center C2, it is possible to provide the circumferential direction wall 92 on the inclined plane 151b. Having done that, it is possible to shorten the protrusion height from the outer diameter side wall part 151 in the rotation axis X direction by an amount ΔH compared to when providing the circumferential direction wall 92 on the bottom surface 151a. As a result, there is a reduction of the amount of material required for forming the circumferential direction wall 92 while maintaining the truss structure function of the circumferential direction wall 92.

(10) The width T9 of the radial direction wall 91 and the circumferential direction wall 92 is thinner than the widths T7, T8 of the ribs 7, 8.

By configuring in this way, it is possible to reduce the overall weight of the transmission case 1 from becoming heavier.

MODIFICATION EXAMPLE

In the embodiments noted above, examples were shown of when the rib 8 is connected to the pin boss 124, but the invention is not limited to this mode. The boss may be for something other than a pin. The rib 8 may also be disposed more to the bolt boss 122b side than the bolt boss 122c in the straight line HL1 direction. In the modification example hereafter, only the parts that differ from the present embodiment are explained.

Figure 18:
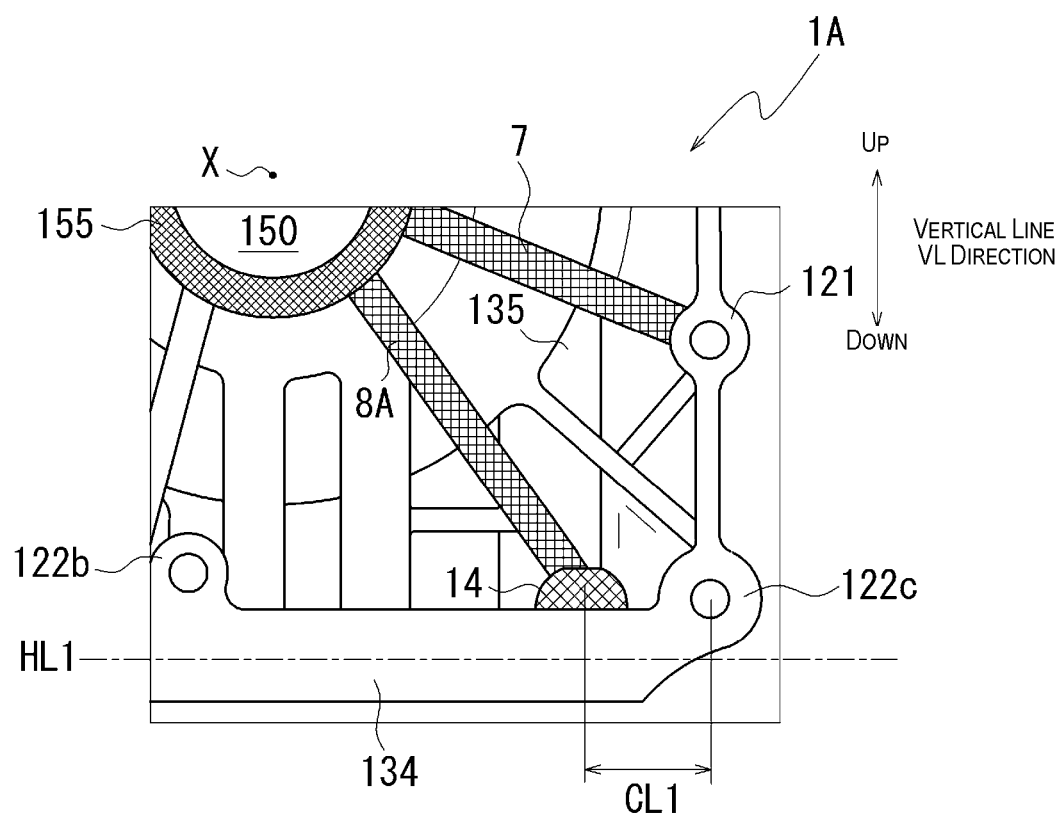
FIG. 18 is a drawing for explaining the transmission case according to a modification example.

FIG. 18 is a drawing for explaining a transmission case 1A according to the modification example.

As shown in FIG. 18, a projection part 14 is provided at a position adjacent to the bolt boss 122c in the straight line HL1 direction on the short wall part 134 of the transmission case 1A. The projection part 14 constitutes the non-fastening boss part to which the bolt B is not secured.

The projection part 14 is provided at a position that is offset by the distance CL1 in the straight line HL1 direction to the bolt boss 122b side from the bolt boss 122c.

A rib 8A extends in the radial direction of the rotation axis X and connects the support part 155 and the projection part 14. In the transmission case 1A of the modification example, the rib 8A is provided between the projection part 14 and the support part 155 and is brought closer to the bolt boss 122b.

Though an illustration is omitted, as a result, during casting, supplying of the molten metal Q through a rib 8A' to the bolt boss 122b' side is promoted, and it is possible to reduce the gas G generated from the molten metal Q becoming caught. Therefore, it is possible to provide the transmission case 1A that reduces the occurrence of cavities and improves yield.

The transmission case 1A according to the modification example has the following configuration, for example.

(1) The transmission case 1A (case) houses the transmission 61 of the drive force transmission device 6.

The transmission case 1A has the support part 155 (circular ring part) that forms the opening 150 through which the output shaft 63 (shaft) that transmits the drive force is inserted.

The plurality of bolt bosses 121 are provided around the support part 155.

Bolt bosses 122a, 122b, 122c are provided around the support part 155.

The bolt bosses 121, 122a, 122b, 122c are fastening boss parts.

The bolt B (fastening member) is secured to each of the bolt bosses 121, 121a, 122b, 122c.

Viewed from the rotation axis X direction (axial direction of the shaft), the ribs 7 (first ribs) are formed between the bolt bosses 121 (portion of the fastening boss parts) among the bolt bosses 121, 122a, 122b, 122c (the plurality of fastening boss parts) and the support part 155.

Among the bolt bosses 121, 122a, 122b, 122c, the bolt bosses 122a, 122b, 122c are the plurality of other fastening boss parts to which the ribs 7 are not connected.

The projection part 14 is provided between the bolt bosses 122b, 122c.

The projection part 14 is the non-fastening boss part to which the bolt B is not secured.

The rib 8A (second rib) is formed between the projection part 14 and the support part 155.

By configuring in this way, it is possible to provide the transmission case 1A that reduces the occurrence of cavities and improves yield.

In the transmission case 1A according to the modification example, the projection part 14 and the bolt boss 122c are separated in the straight line HL1 direction, but they may also be linked to each other. As a result, in the mold M, it is possible to make the space in which the molten metal Q is pooled larger, and to increase the amount of the molten metal Q supplied to the rib 8A'.

In the present embodiment, as an example of the case, we showed an example of the transmission case 1 mounted in a vehicle, but the invention is not limited to this mode. It is also possible to apply this to a case used for something other than a vehicle.

Above, embodiments of the present invention were explained, but the abovementioned embodiment merely shows one application example of the present invention, and the claims of the present invention are not limited to the specific configurations of the embodiments noted above.

Suitable modifications are possible within the scope of technical concepts of the invention.

EXPLANATION OF CODES 1, 1A: Transmission case (case); 6: Drive force transmission device; 7: Rib (first rib); 8, 8A: Rib (second rib); 9: Rib (third rib; 14: Projection part (non-fastening boss part); 63: Output shaft (shaft); 91: Radial direction wall; 92: Circumferential direction wall; 13a: Lower end surface (one end face); 121: Bolt boss (portion of fastening boss parts to which the first ribs are connected); 121a: Recess; 122a, 122b, 122c: Bolt boss (plurality of other fastening boss parts to which the first ribs are not connected); 122d: Recess; 124: Pin boss (non-fastening boss part); 124a: Pin hole (recess); 13a: Lower end surface (one end face); 150: Opening; 155: Support part (circular ring part); B: Bolt (fastening member); C1: Center (center of the plurality of other fastening boss parts to which the first ribs are not connected); Cs2: Center (center of the portion of fastening boss parts to which the first ribs are connected); K: Intersection part; M: Mold; P2: Pin; Q: Molten metal; and X: Rotation axis (shaft axis).

The invention claimed is:

1. A case that houses a drive force transmission device, comprising:
    a circular ring part defining an opening through which a shaft that transmits a drive force is configured to be inserted;
    a plurality of fastening boss parts provided around the circular ring part, to which fastening members are to be secured;
    a plurality of first ribs respectively formed between a portion of the fastening boss parts and the circular ring part when viewed from an axial direction of the shaft;
    a non-fastening boss part provided between adjacent ones of the fastening boss parts to which the first ribs are not connected when viewed from the axial direction, a fastening member being not configured to be secured to the non-fastening boss part; and
    a second rib formed between the non-fastening boss part and the circular ring part, wherein
    the non-fastening boss part is a pin boss part defining a recess in which a pin for positioning is to be inserted, and
    the second rib extends along a line passing through the recess defined by the non-fastening boss part when viewed from the axial direction of the shaft.

2. A case that houses a drive force transmission device, comprising:
    a circular ring part defining an opening through which a shaft that transmits a drive force is configured to be inserted;
    a plurality of fastening boss parts provided around the circular ring part, to which fastening members are to be secured;
    a plurality of first ribs respectively formed between a portion of the fastening boss parts and the circular ring part when viewed from an axial direction of the shaft;
    a non-fastening boss part provided between adjacent ones of the fastening boss parts to which the first ribs are not connected when viewed from the axial direction, a fastening member being not configured to be secured to the non-fastening boss part; and
    a second rib formed between the non-fastening boss part and the circular ring part, the second rib extending along a line passing through a hole or a recess defined by the non-fastening boss part when viewed from the axial direction of the shaft, wherein
    when viewed from the axial direction, the non-fastening boss part is provided between one end face of the case in a radial direction of the shaft and the circular ring part, and
    casting of the case is done by supplying molten metal from a side of the one end face in the radial direction.

3. The case according to claim 2, wherein
    the non-fastening boss part is linked to one of the fastening boss parts to which the first ribs are not connected.

4. The case according to claim 3, further comprising
    an arc-shaped recess portion provided in each of a region in which the fastening boss parts to which the first ribs are not connected are provided, and a region in which the portion of the fastening boss parts to which the first ribs are connected are provided, and
    when viewed from the axial direction, a radius of the recess portion of the region in which the fastening boss parts to which the first ribs are not connected are provided is greater than a radius of the recess portion of the region in which the portion of the fastening boss parts to which the first ribs are connected are provided.

5. The case according to claim 4, further comprising
    a third rib provided between one of the first ribs and the second rib adjacent in a circumferential direction around an axis of the shaft.

6. The case according to claim 5, wherein
    a cross section of the third rib is a truss structure when viewed from the axial direction.

7. The case according to claim 6, wherein
    the third rib includes
        a radial direction wall extending to a radial inner diameter side of the shaft from one of the fastening boss parts to which the first ribs are not connected, and
        a circumferential direction wall in which the radial direction wall and one of the portion of the fastening boss parts to which the first ribs are connected are connected in the circumferential direction, wherein
    the third rib constitutes the truss structure by connecting three points of an intersection part of the radial direction wall and the circumferential direction wall, one of the fastening boss parts to which the first ribs are not connected, and one of the portion of the fastening boss parts to which the first ribs are connected.

8. The case according to claim 7, wherein
    when viewed from the axial direction, the radial direction wall and the circumferential direction wall are provided at positions each offset in a direction approaching each other from a center of one of the fastening boss parts to which the first ribs are not connected and a center of one of the portion of the fastening boss parts to which the first ribs are connected.

9. The case according to claim 8, wherein
    the radial direction wall and the circumferential direction wall are thinner than the first ribs and the second rib.

10. The case according to claim 1, wherein
    when viewed from the axial direction, the non-fastening boss part is provided between one end face of the case in a radial direction of the shaft and the circular ring part, and
    casting of the case is done by supplying molten metal from a side of the one end face in the radial direction.

11. The case according to claim 10, wherein
the non-fastening boss part is linked to one of the fastening boss parts to which the first ribs are not connected.

12. A case that houses a drive force transmission device, comprising:
a circular ring part defining an opening through which a shaft that transmits a drive force is to be inserted;
a plurality of fastening boss parts provided around the circular ring part, to which fastening members are to be secured;
a plurality of first ribs respectively connected to outer circumferences of a portion of the fastening boss parts and the circular ring part when viewed from an axial direction of the shaft;
a non-fastening boss part provided between adjacent ones of the fastening boss parts to which the first ribs are not connected when viewed from the axial direction, a fastening member being not configured to be secured to the non-fastening boss part; and
a second rib formed between the non-fastening boss part and the circular ring part, the second rib extending along a line passing through a hole or a recess defined by the non-fastening boss part when viewed from the axial direction of the shaft.

13. The case according to claim 12, wherein
the non-fastening boss part is a pin boss part having the recess in which a pin for positioning is to be inserted.

14. The case according to claim 12, wherein
when viewed from the axial direction, the non-fastening boss part is provided between one end face of the case in a radial direction of the shaft and the circular ring part, and
casting of the case is done by supplying molten metal from a side of the one end face in the radial direction.

15. The case according to claim 14, wherein
the non-fastening boss part is linked to one of the fastening boss parts to which the first ribs are not connected.

16. The case according to claim 15, further comprising
an arc-shaped recess portion provided in each of a region in which the fastening boss parts to which the first ribs are not connected are provided, and a region in which the portion of the fastening boss parts to which the first ribs are connected are provided, and
when viewed from the axial direction, a radius of the recess portion of the region in which the fastening boss parts to which the first ribs are not connected are provided is greater than a radius of the recess portion of the region in which the portion of the fastening boss parts to which the first ribs are connected are provided.

17. The case according to claim 16, further comprising
a third rib provided between one of the first ribs and the second rib adjacent in a circumferential direction around an axis of the shaft.

18. The case according to claim 17, wherein
a cross section of the third rib is a truss structure when viewed from the axial direction.

19. The case according to claim 18, wherein
the third rib includes
a radial direction wall extending to a radial inner diameter side of the shaft from one of the fastening boss parts to which the first ribs are not connected, and
a circumferential direction wall in which the radial direction wall and one of the portion of the fastening boss parts to which the first ribs are connected are connected in the circumferential direction, wherein
the third rib constitutes the truss structure by connecting three points of an intersection part of the radial direction wall and the circumferential direction wall, one of the fastening boss parts to which the first ribs are not connected, and one of the portion of the fastening boss parts to which the first ribs are connected.

20. The case according to claim 19, wherein
when viewed from the axial direction, the radial direction wall and the circumferential direction wall are provided at positions each offset in a direction approaching each other from a center of one of the fastening boss parts to which the first ribs are not connected and a center of one of the portion of the fastening boss parts to which the first ribs are connected.

21. The case according to claim 20, wherein
the radial direction wall and the circumferential direction wall are thinner than the first ribs and the second rib.

\* \* \* \* \*